United States Patent [19]

Forman, Jr. et al.

[11] 4,048,619
[45] Sept. 13, 1977

[54] SECURE TWO CHANNEL SCA BROADCASTING SYSTEM

[75] Inventors: Aubry S. Forman, Jr., Toledo, Ohio; Charles A. Schultz, Jr.; William E. Vice, both of Gainsville, Fla.

[73] Assignee: Digital Data Inc., Toledo, Ohio

[21] Appl. No.: 721,316

[22] Filed: Sept. 7, 1976

[51] Int. Cl.$^2$ .................. H04B 7/26; H04H 1/08; H04J 1/14; H04Q 9/00

[52] U.S. Cl. .................. 340/154; 179/15 BT; 325/33; 325/36; 325/45; 340/152 R; 340/170; 340/311

[58] Field of Search .................. 325/31, 39, 40, 45, 325/53, 54, 36, 58, 33, 154, 469, 158, 304; 343/175, 176, 179; 332/20, 21; 340/154, 170, 152 R, 311; 329/110, 111, 136; 334/52, 47; 179/1.5 R, 2 DP, 15 BT

[56] References Cited

U.S. PATENT DOCUMENTS

| 3,478,169 | 11/1969 | Saito | 179/15 BT |
|---|---|---|---|
| 3,679,832 | 7/1972 | Halpern | 179/15 BT |
| 3,885,217 | 5/1975 | Cintron | 179/1.5 R X |
| 3,902,019 | 8/1975 | Bruene | 179/15 BT |
| 4,002,991 | 1/1977 | Ogita | 329/110 |

Primary Examiner—Donald J. Yusko
Attorney, Agent, or Firm—William J. Clemens

[57] ABSTRACT

A secure information broadcasting system including a central broadcasting station for encoding data in binary form utilizing a keyword and transmitting on one frequency a FM-SCA signal phase shift modulated by the encoded data. The encoded data is also supplied to one or more remote broadcasting stations, typically via telephone lines, where it is transmitted on a second frequency as a FM-SCA signal phase shift modulated by the encoded data. Each remote station transmits a relatively low power signal in a predetermined local area, such as an office building, while the central station transmits a relatively high power signal in a general area including one or more of the local areas. The general area signal is transmitted with a time delay relative to the remote stations. Each of a plurality of portable receiving terminals has an identification number stored therein. When a subscriber desires to display the broadcast information on his terminal, he enters a unique password which is combined with the identification number to generate the keyword. The keyword is utilized to decode the received binary data. The terminal alternately tunes in the two frequencies and will lock on the first frequency signal when the terminal is within the general area but outside the local areas. The terminal will lock on the signal first received in the local area and a reset switch is provided to force the terminal to lock on the second frequency signal when the first frequency signal is present and is first selected in a local area.

11 Claims, 5 Drawing Figures

TWO CHANNEL SELECT CIRCUIT

SECURE TWO CHANNEL SCA BROADCASTING SYSTEM

BACKGROUND OF THE INVENTION

1. Field of the Invention

The present invention relates to a secure FM-SCA broadcasting system having a central and one or more remote broadcasting stations for transmitting encoded data and a subscriber actuated portable receiving terminal for decoding and displaying the data.

2. Description of the Prior Art

One of the problems associated with the buying and selling of securities and commodities has been satisfying the need for current information at locations remote from the various exchanges and other trading places. An initial solution by the stock brokerage houses was the direct display of information provided via teletype by the various exchanges. However, such a display either required a customer to visit his brokerage house or to phone his stockbroker and request that one or more stocks be watched. Since the information was transmitted and received in serial form, either method of obtaining the information required the expenditure of much time on the part of the person observing the display.

A subsequent solution was the development of a quotation terminal and high speed transmission of the data from a central data processing and storage unit. The terminal user, typically the stockbroker, could request information on a particular stock for immediate display. Still, there was the necessity to either call the stockbroker for current information or visit the brokerage house where the customer had access to the terminal. However, since most customers were reluctant to call the stockbroker where they were not contemplating a transaction and did not have the time available for frequent trips to the brokerage house, they did without the information. Such inaction tended to stifle transactions.

The difficulty in obtaining information and the high cost of a quotation terminal for an individual customer led to the development of a less expensive personal data terminal. One form of such a terminal is shown in U.S. Pat. No. 3,716,835 issued on Feb. 13, 1973. A data processor receives stock market information via teletype lines or other high speed lines and stores the data in a memory. A personal quotation terminal is connected to the data processor by telephone lines for bidirectional communication. The terminal includes an acoustic coupler for a telephone handset, a keyboard for entering address and control signals, and display means. The customer dials the telephone number of the data processor and when connected places the handset in contact with the acoustic coupler. The customer then enters the address of the desired stock information which is sent to the data processor over the telephone line. The data processor sends the current information through the telephone line to the terminal where it is displayed. However, such a system has the disadvantages of requiring that a telephone be available and that the data processor not be busy with inquiries from other customers. Potentially, a few customers could tie up all the telephone input lines by leaving their terminals connected to the data processor although they were not requesting information.

An alternate form of a personal quotation terminal which solves many of the problems associated with the telephone coupled system is shown in U.S. Pat. No. 3,611,294. The stock data is processed, encoded and transmitted by a modulated carrier wave. A plurality of portable receivers each separate the data from the carrier wave and compare a portion of the data representing a stock identification code with the code entered by the customer. If the codes are the same, the data is displayed. The terminal may be utilized on a subscription basis where a subscriber is provided with a punched card to be inserted into a translator. A stock code is set on a plurality of code wheels which cooperate with the translator to establish an identification code for the stock. However, since the terminal cannot be operated without the card, it is vunerable to inoperation due to misplaced, lost or forgotten cards. Furthermore, a borrowed or stolen card permits unauthorized use and it is relatively easy to discover the card code for a new pay period buy observing the transmitted data in the old and new pay periods and knowing the card code for the old pay period.

SUMMARY OF THE INVENTION

The information broadcasting system according to the present invention includes the system disclosed in U.S. patent application Ser. No. 675,504, filed Apr. 9, 1976 and entitled "A Secure SCA Broadcasting System Including Subscriber Actuated Portable Receiving Terminals" which is incorporated herein by reference. The information broadcasting system according to the referenced patent application includes a central broadcasting station which receives data to be transmitted from one or more data sources. A data encoder which includes a digital computer encodes the data in binary form utilizing a keyword. Then the encoded binary data is utilized to phase shift modulate a FM-SCA carrier wave at three times the stereo pilot frequency.

A portable receiver terminal includes a tuned FM receiver for separating the phase shifted modulation signal, converting it to binary data and decoding the binary data into the encoded binary data generated by the computer at the central broadcasting station. The stereo pilot signal is utilized to synchronize the decoding of the data.

The portable terminal also includes a keyboard for entering a password, information or command signals requesting the display of data. An identification number is stored in the terminal and is utilized with a password unique to the subscriber and the pay period to generate the keyword used by the computer to encode the data. The terminal utilizes the keyword to decode the received data which can be stored for future use or displayed. The terminal includes a multi-element star pattern alpha-numeric display for a visual output of the desired data.

In the present invention, the data encoder delays the encoded data for a predetermined period of time before it is utilized to phase shift modulate a FM-SCA carrier of a first frequency. The modulated FM-SCA carrier is transmitted over a general broadcast area by a relatively high power FM-SCA transmitter. The data encoder also generates the encoded data on a real time basis to one or more remote broadcast stations. Each remote station includes a relatively low power FM-SCA transmitter which utilizes the encoded data to phase shift modulate a FM-SCA carrier of a second frequency and transmit the modulated carrier over a local broadcast area which is included in the general broadcast area.

The portable receiving terminal disclosed in the referenced patent application has been modified according to the present invention to alternately tune to the first and second frequencies and lock on the first one of the two frequencies to exhibit the SCA component of the FM signal. A local oscillator is switched between a pair of reference frequencies which are combined with a respective one of the broadcast frequencies to produce the same intermediate frequency difference signal. The difference signal is checked for the SCA component and, if the component is present, the oscillator will stop switching.

If the oscillator has locked on the general area first frequency signal to receive the time delayed data, it is desirable to be able to switch to the local area second frequency signal to receive the real time data. Therefore, a manual reset switch is provided on the portable receiving terminal for switching the local oscillator to the reference frequency associated with the second frequency signal. If the SCA component is detected, the portable terminal will lock on the second frequency signal to receive real time data. If no SCA component is present, the portable terminal will automatically switch back to the first frequency signal.

It is an object of the present invention to provide a secure information broadcasting system accessible by subscriber actuated portable receiving terminals.

It is another object of the present invention to provide a relatively inexpensive, easily portable information receiving and display terminal.

It is a further object of the present invention to provide an information broadcasting system in which data to be displayed is selected from a continuously transmitted stream of current data.

It is another object of the present invention to provide a secure two channel broadcasting system accessible by subscriber actuated portable receiving terminals wherein secure information is available on a real time basis on one channel and the same information is available on a delayed time basis on the other channel.

It is a further object of the present invention to provide a secure two channel broadcasting system accessible by subscriber actuated portable receiving terminals which automatically switch between the two channels until the transmitted secure information signal is detected on one of the channels whereupon the terminal locks on that channel.

DESCRIPTION OF THE PREFERRED EMBODIMENT

Figure 1:
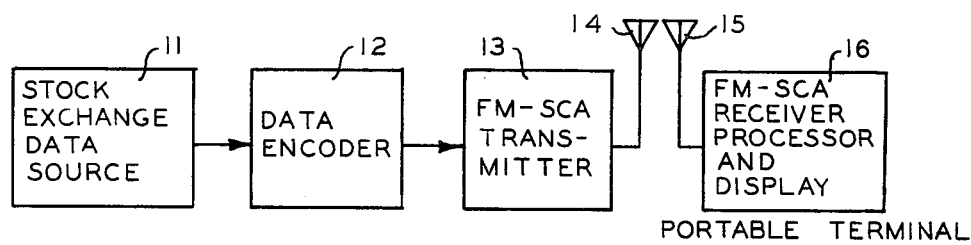
FIG. 1 is a block diagram of a central broadcasting station and a portable receiving terminal as disclosed in the referenced patent application, Ser. No. 675,504.

Referring to FIG. 1, there is shown a block diagram of a central broadcasting station and a single portable receiving terminal according to the previously referenced U.S. patent application Ser. No. 675,504. The broadcasting station receives data to be transmitted from one or more sources such as a stock exchange data source 11. Source 11 may be any of a number of security exchanges, over-the-counter security dealers or any other source of current information relating to securities. The data from the source is encoded in a data encoder 12. The encoder may be required to convert the data to a binary form, but its primary function is to encode the data so that when the data is transmitted it is secure from unauthorized access and use of the portable terminal is limited to prepaid subscribers.

The encoded data is utilized to frequency modulate a carrier wave in a FM-SCA transmitter 13 and the modulated carrier wave is transmitted by means of an antenna 14. At the portable terminal, the modulated carrier is received by an antenna 15 connected to a FM-SCA receiver 16. The receiver 16 demodulates the signal to obtain the encoded data. The receiver 16 also includes a processor for processing the data and a display for a visual output of selected portions of the data.

Figure 2:
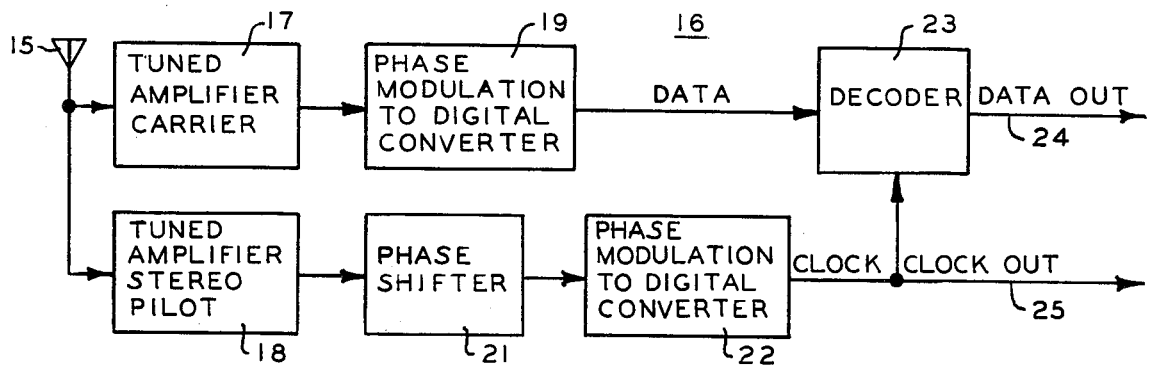
FIG. 2 is a block diagram of the FM-SCA receiver and decoder of FIG. 1.

A more detailed block diagram of a portion of the FM-SCA receiver 16 of FIG. 1 is shown in FIG. 2. The antenna 15 is connected to the inputs to a pair of tuned amplifiers, a tuned amplifier 17 for the modulated carrier signal and a tuned amplifier 18 for the stereo pilot signal. The data was encoded by the data encoder 12 and used to phase shift modulate the carrier at three times the stereo pilot frequency. Typically, the frequency of the stereo pilot signal is 19 KHz which results in a 57 KHz center frequency for the phase modulated signal. The tuned amplifier 17 may be a conventional circuit for separating the 57 KHz signal from the other components of the FM signal. A phase modulation to digital converter circuit 19 shapes the 57 KHz signal to generate the encoded data at definable logic levels. Throughout this description a negative or low logic level will be represented by a 0 and a positive or high logic level will be represented by a 1.

In a similar manner, the tuned amplifier 18 separates the stereo pilot signal from the other components of the FM signal. The stereo pilot signal is utilized as a clock signal to synchronize the decoding of the data with the encoding of the data at the broadcast station. A phase shifter circuit 21 provides for phase shifting of the stereo pilot signal with respect to the 57 KHz data signal to obtain coincidence between the sampling time and the group of logic signals to be sampled. A phase modulation to digital converter circit 22 shapes the 19 KHz signal to generate a train of clock pulses at definable logic levels. The data signals and the clock signals are applied to a decoder circuit 23. The data out signal from the decoder 23 will be a logic signal which reflects the state of the data signal at a 0 to 1 transistion of the clock signal. The data out and clock out signals are sent to a receiver interface circuit included in the FM-SCA receiver 16 of FIG. 1.

Figure 3:
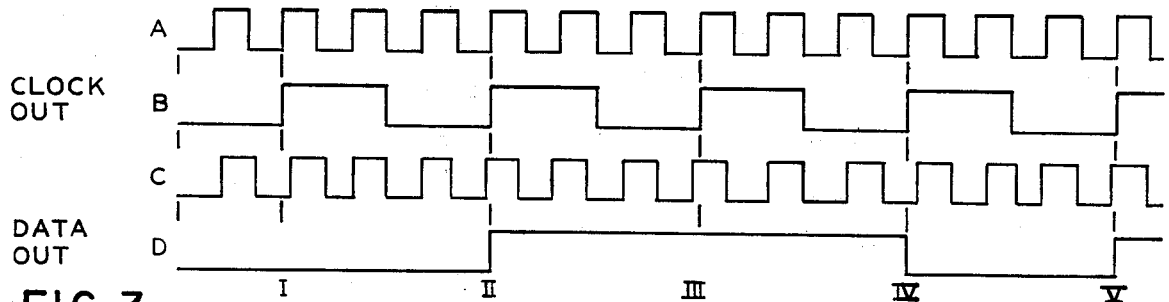
FIG. 3 shows a set of wave forms for signals generated in the circuit of FIG. 2.

The decoder 23 can be a conventional D-type flip flop having a noninverting output which generates a logic signal reflecting the state of a logic signal at a data input when there is a 0 to 1 transistion at a clock input. In FIG. 2, the data signal is supplied to the data input, the clock signal is supplied to the clock input and the data out signal is generated at the noninverting output. There are shown in FIG. 3 various pulse trains associated with the decoder 23. A wave form A represents the unmodulated 57 KHz data signal from the converter 19 while a wave form B represents the 19 KHz stereo pilot signal. The phase shifter 21 can be utilized to shift the wave form B to a time referenced position relative to the wave form A wherein the leading edge of each 1 pulse of the A wave form coincides with the leading edge of a corresponding one of every third 1 pulse of the B wave form. When data is encoded at the broadcasting station, the wave form B is modulated by phase shifting as shown in a wave form C. The 0 to 1 transistion of every third pulse of wave form C takes place either before or after the corresponding transistions in the B wave form.

When the wave form A is received at the data input of the flip flop, the input signal will be at the same logic level each time a 1 clock pulse clocks the flip flop. With the relationship shown in FIG. 3, the flip flop data out signal will be maintained at 0 since the wave form A is always at 0 before the 1 pulse of the clock signal occurs. However, a phase shifted data signal will generate changes in the data out signal. In FIG. 3, a wave form D represents the data out signal for the data signal wave form C and the clock signal wave form B. Assume that the previous sample had generated a 0 from the flip flop. At time I another sample is taken and, since the wave form C is at 0, the output data signal D will remain at 0. At time II another sample is taken and the wave form C has been shifted to be at 1 so that the data out signal D changes to 1. Other samples at times III, IV and V generate a series of 0 and 1 pulses, one for each sample period, which represent serial data decoded from the phase modulated 57 KHz signal. The data out signal and the clock out signals are sent to a receiver interface circuit (not shown) included in the FM-SCA receiver 16 of FIG. 1.

Figure 4:
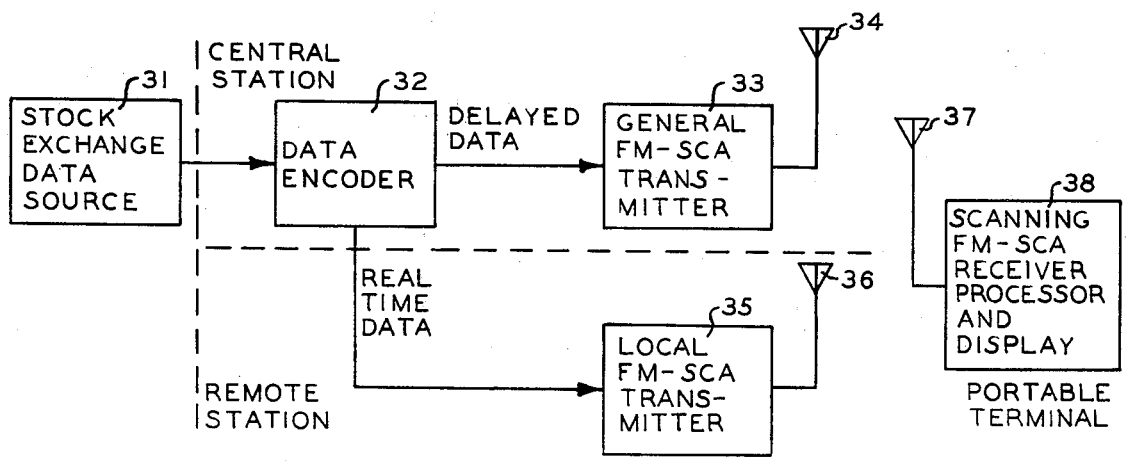
FIG. 4 is a block diagram of a secure two channel SCA broadcasting system including a central station, a local station and a portable receiving terminal according to the present invention.

Referring to FIG. 4, there is shown a block diagram of a secure two channel SCA broadcasting system according to the present invention. The central broadcasting station receives data to be transmitted from one or more sources such as a stock exchange data source 31. The source 31 can be any of a number of security exchanges, over-the-counter security dealers or any other source of current information relating to securities. The data from the source is encoded in a data encoder 32. As in the circuit of FIG. 1, the encoder may be required to convert the data to a binary form, but its primary function is to encode the data so that when the data is transmitted it is secure from unauthorized access and use of the portable terminal is limited to prepaid subscribers.

In addition to the data encoder 32, the central station includes a general FM-SCA transmitter 33 and an antenna 34. The encoded data is time delayed and the delayed encoded data is utilized to frequency modulate a carrier wave in the FM-SCA transmitter 33. The transmitter 33 is a relatively high power device which transmits the modulated carrier wave by means of the antenna 34 over a general area, typically that area within a fifty mile radius of the antenna.

The data encoder 32 also generates the encoded data on a real time basis to one or more remote stations such as the illustrated remote station including a relatively low power local FM-SCA transmitter 35 and an antenna 36. The encoded data is utilized to frequency modulate a carrier wave in the transmitter 35 and the modulated carrier wave is transmitted in a local area, typically included in the general area, by means of the antenna 36. The carrier frequencies of the transmitter 33 and 35 are different but both lie in the 88 to 108 MHz band.

At the portable terminal, an antenna 37 is utilized to receive both of the modulated carrier waves. A FM-SCA receiver portion of a portable terminal 38 scans for a signal by alternately tuning to the frequencies transmitted by the transmitters 33 and 35. If the receiver detects a SCA component at the first frequency to which it tunes, the receiver stops scanning and locks on that frequency. If no SCA component is detected, the receiver tunes to the other frequency. If no SCA component is detected at either frequency, the receiver will continue to scan by switching between the two frequencies until a SCA component is detected and the receiver locks on it.

If the receiver has locked on the general SCA component and then is brought into an area where a local SCA component is present, or if the receiver locks on the general SCA component in an area where both the general and the local SCA components are present, a reset switch (not shown) is provided for resetting the scanning circuit to the frequency of the remote station. When the receiver resets, the received transmission will be changed from time delayed data to real tme data. Thus, for example, the portable terminal will receive and display current financial data when it is within a local broadcast area such as a stockbroker's office and will automatically switch to time delayed financial data when the terminal is outside the local broadcast area but still within a general broadcast area for the central broadcasting station.

Figure 5:
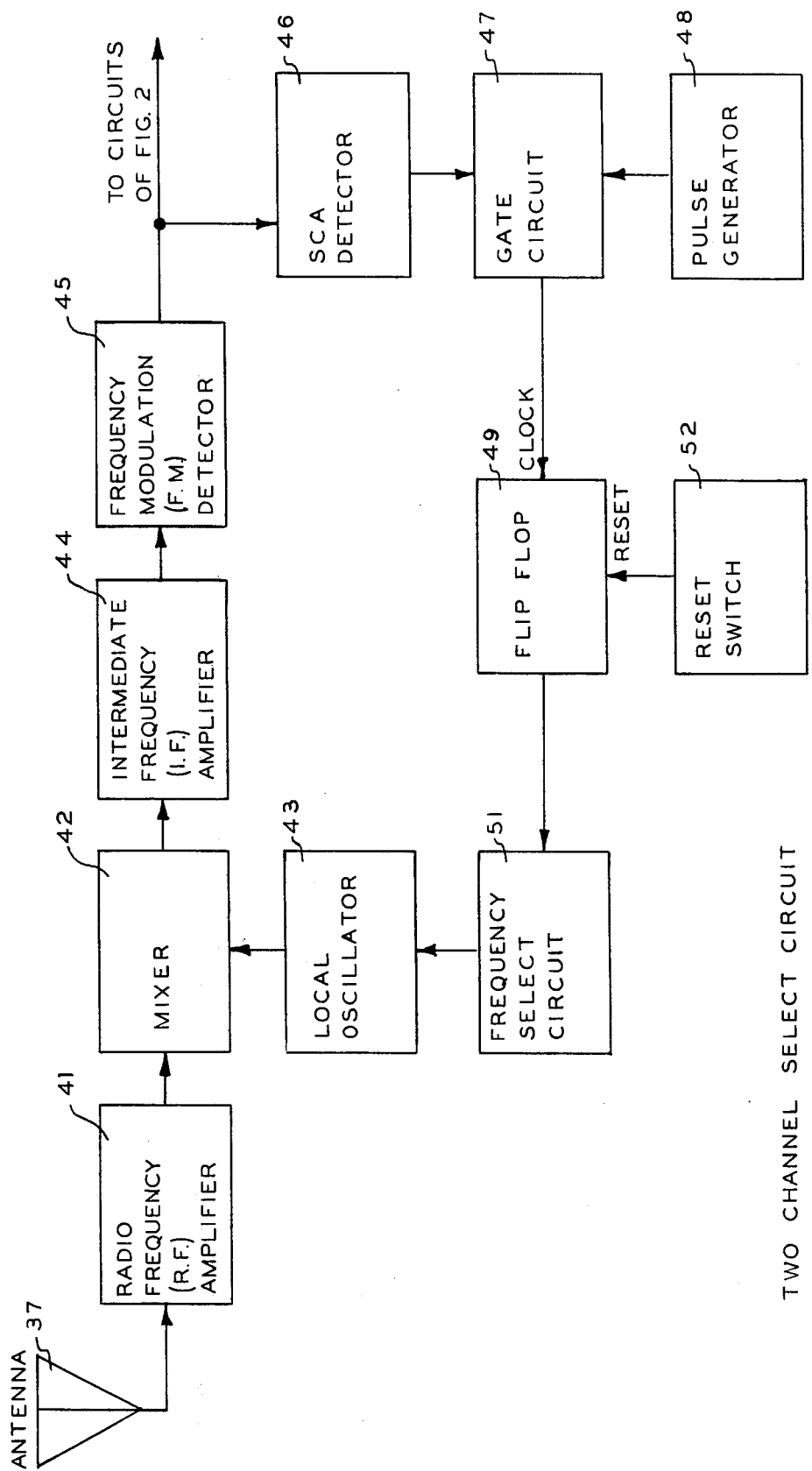
FIG. 5 is a more detailed block diagram of the FM-SCA receiver and decoder portion of the portable receiving terminal of FIG. 4.

There is shown in FIG. 5 a more detailed block diagram of the FM-SCA receiver and decoder portion of the portable terminal 38 of FIG. 4. The antenna 37 is connected to an input of a radio frequency (R.F) amplifier 41 which is tuned so as to have a relatively flat response over the 88–108 MHz standard FM broadcast band. The output from the R.F. amplifier is one input to a mixer 42. A second input to the mixer 42 is provided by a local oscillator 43. The mixer 42 combines the two input signals to generate a difference signal which is typically 10.7 MHz. The difference signal is generated so that a fixed tuned amplifier, an intermediate frequency (I.F.) amplifier 44, can be used for the amplification of all incoming signals irrespective of the carrier frequencies. The output signal from the I.F. amplifier 44 is applied to a frequency modulation (F.M.) detector 45 to minimize noise in the output signal. The noise is best minimized when the receiver does not respond to amplitude variations and this is accomplished by employing a limiter or a ratio detector or both as represented by the F.M. detector 45. The output from the detector 45 is a 10.7 MHz amplified and noise limited signal which can be applied to the circuits of FIG. 2 to decode the carrier and the SCA component.

The detected 10.7 MHz signal is also applied to an input of a SCA detector 46. If the SCA component is present in the 10.7 HMz signal, the SCA detector 46 will generate an output signal to a gate circuit 47. A free-running pulse generator 48 generates a train of pulses which are applied to another input of the gate circuit 47. When the SCA detector 46 has not detected an SCA component and therefor has not generated the output signal, the gate 47 will remain open to apply the pulse train from the pulse generator 48 to a clock input of a flip flop 49. The flip flop 49 will alternately generate two different select signals in response to the pulses of the pulse train. The select signals are applied to a frequency select circuit 51 which switches the local oscillator 43 between two frequencies which are 10.7 MHz below the respective ones of the general area first frequency and the local area second frequency. For example, if the first frequency is 100 MHz and the second frequency is 100.5 MHz, the local oscillator 43 will be switched between 89.3 MHz and 89.8 MHz to generate the 10.7 MHz difference signal from the mixer 42.

When the SCA detector 46 detects a SCA component, an output signal is generated to shut the gate 47 and remove the pulse train from the clock input of the flip flop 49. The flip flop 49 then stops alternating the select signals and continuously generates the one select signal corresponding to the local oscillator frequency which produced the 10.7 MHz signal having the detected SCA component. The receiver will remain locked on the selected broadcast frequency until the SCA component is no longer present. Then the SCA detector 46 will cease to generate its output signal and the gate 47 will pass the pulse train to cycle the flip flop 49, the frequency select circuit 51 and the local oscillator 43.

A manually actuated reset switch 52 is provided for resetting the receiver to the second frequency carrier signal if it is locked on the first frequency carrier signal. The reset switch 52 generates a signal to a reset input of the flip flop 49 to reset the flip flop to generate the select signal associated with the second frequency carrier signal. If the SCA component of the second frequency carrier signal is present, the SCA detector 46 will shut the gate 47 to prevent a pulse from clocking the flip flop 49 and the receiver locks on the second frequency carrier signal.

The selected 10.7 MHz signal is available on an output line 53 which can be connected to a circuit similar to the receiver and detector circuit shown in FIG. 2. The modulated difference signal can be applied to the inputs of the tuned amplifiers 17 and 18. The tuned amplifier 17 separates the 57 KHz phase modulated signal from the other components of the FM signal and the phase modulation to digital converter circuit 19 shapes the 57 KHz signal to generate the encoded data at definable logic levels. In a similar manner, the tuned amplifier 18 separates the stereo pilot signal from the other components of the FM signal. The phase shifter circit 21 provides for phase shifting of the stereo pilot signal with respect to the 57 KHz data signal to obtain coincidence between the sampling time and the group of logic signals to be sampled. The phase modulation to digital converter circuit 22 shapes the 19 KHz signal to generate a train of clock pulses at definable logic levels. The data signals and the clock signals are applied to the decoder circuit 23 to generate a data out signal which is a logic signal and reflects the state of the data signal at a 0 to 1 transistion of the clock signal. The data out and clock out signals are sent to a receiver interface circuit (not shown) which is included in the FM-SCA receiver 38 of FIG. 4 and is disclosed in the referenced patent application, Ser. No. 675,504.

In summary, the present invention concerns a secure two channel information broadcasting system including a central broadcastng station, one or more remote broadcasting stations and a terminal means for receiving, decoding and displaying encoded data transmitted by the broadcasting stations. The central station encodes and transmits, as an SCA component of a FM carrier signal having a first frequency, data received from an information source. The remote broadcasting station transmits, as an SCA component of a FM carrier signal having a second frequency, the encoded data received from the central broadcasting station. Typically, the central broadcasting station transmits the encoded data on a time delayed basis and the remote station transmits the encoded data on a real time basis as it is received over a telephone line from the central broadcasting station.

The terminal means includes means for receiving FM carrier signals in a frequency band including the first and second frequency carrier signals, means for alternately generating first and second reference signals which differ from the frequencies of the first and second frequency carrier signals respectively by a predetermined frequency, means responsive to the receiving means for combining the first frequency carrier signal with the first reference signal and for combining the second frequency carrier signal with the second reference signal to generate a difference signal having the predetermined frequency, means responsive to the difference signal for detecting the SCA components and for directing the reference signal generator to continue to generate the one of the reference signals associated with the one of the carrier signals having its SCA component first detected, and means for decoding and displaying the encoded data from the detected SCA component. The receiving means can be an antenna connected to the input of a radio frequency amplifier tuned for amplifying signals in a frequency band including the first and second frequency carrier signals. The reference signal generating means can include means for generating a train of pulse signals, means for generating a bistable output signal and being responsive to the pulse signals for switching the bistable output signal between two stable states, a frequency select circuit for generating first and second select signals in response to respective states of the bistable output signal and a local oscillator responsive to the first and second select signals for generating the first and second reference signals respectively. The means for generating a bistable output signal can be a flip flop of the conventional D-type having an inverting output connected to a data input so that each pulse signal from the pulse generator will switch the flip flop output signal between a 1 state and a 0 state.

The means for detecting the SCA components can include a SCA detector having an input connected to the difference signal generating means for detecting the presence of the SCA component in the difference signal and a gate circuit connected between the pulse generating means and the means for generating a bistable output signal. The gate circuit is normally open to pass the pulse signal to the bistable output signal generating means, but closes in response to the generation of an output signal by the SCA detector representing the detection of an SCA component to prevent the passage of the pulse signals. Thus, the bistable output signal generating means no longer receives pulse signals causing it to switch states and the reference signal generator means will continue to generate the reference signal having the SCA component which was detected. Therefore, the receiving means is locked on the carrier signal having the detected SCA component.

If a subscriber enters a local area and the receiving means is locked on the general area broadcast signal, it is desirable to be able to switch to the local area broadcast signal. A reset signal generating means is provided for generating a reset signal to the bistable output signal generating means which is responsive to the reset signal for generating a predetermined one of its stable states. The reset signal can be applied to a reset input of the above-described flip flop to generate a 0 output signal.

The frequency select circuit and the local oscillator respond to generate the second select signal and second reference signal respectively to lock the receiving means on the second frequency carrier signal if its SCA component is present.

The FM-SCA transmitting and receiving circuits utilized in the present invention can be any conventional, well-known radio circuits which operate in accordance with the desired operating powers and the available frequencies. The circuits for decoding and displaying the encoded data are disclosed in the referenced patent application Ser. No. 675,504.

It will be appreciated that the present invention lends itself to configurations other than the described preferred embodiment based upon such factors as the availability and cost of various communication formats. For example, the data source 31 and data encoder 32 could be located in one city with the delayed data and real time data being communicated to FM-SCA transmitters in a plurality of cities over telephone lines microwave links, satellite links or any other suitable communication means. In such a case, each central station would include the single data encoder 32 and an individual general FM-SCA transmitter in each city. The real time data could be sent directly to the transmitter of each remote station or could be sent through the general transmitter in the associated central station. In the latter case, the general transmitter could transmit the real time data and delayed time data on separate SCA frequencies on the same FM carrier. The local transmitter at the remote station would include a receiver tuned to receive the real time data and means to convert the real time data signal frequency to the broadcast frequency of the remote station. Furthermore, other combinations of data encoder location and communications format can be utilized to generate the transmission of the delayed data and real time data on separate frequencies.

In accordance with the provisions of the patent statutes, the principle and mode of operation of the invention have been explained and illustrated in its preferred embodiment. However, it must be understood that the invention may be practiced otherwise than as specifically illustrated and described without departing from its spirit or scope.

What is claimed is:

1. A secure two channel information broadcasting system comprising:
a central broadcasting station for encoding and transmitting, as an SCA component of a FM carrier signal having a first frequency, data received from an information source;
a remote broadcasting station for transmitting, as an SCA component of a FM carrier signal having a second frequency, said encoded data received from said central broadcasting station; and
a terminal for receiving, decoding and displaying said encoded data including means for receiving FM carrier signals in a frequency band including said first and second frequency carrier signals, means for alternately generating first and second reference signals each having a frequency which differs by a predetermined frequency from the frequencies of said first and second frequency carrier signals respectively, means responsive to said receiving means and to said reference signal generating means for combining said first frequency carrier signal with said first reference signal and for combining said second frequency carrier signal with said second reference signal to generate a difference signal having said predetermined frequency, means responsive to said difference signal for detecting said SCA components and for directing said reference signal generator means to continue to generate the one of said reference signals associated with the one of said carrier signals having its SCA component first detected whereby said receiving means locks on said one carrier signal, and means for decoding and displaying said encoded data from said SCA components of said carrier signals.

2. A system according to claim 1 wherein said central broadcasting station time delays said transmission of said encoded data with respect to said transmission of said encoded data by said remote broadcasting station.

3. A system according to claim 2 wherein said remote broadcasting station receives said encoded data from said central broadcasting station via a telephone line and transmits said encoded data on a real time basis.

4. A system according to claim 1 wherein said central broadcasting station includes a relativey high power transmitter for transmitting said encoded data over a general area and said remote broadcasting station includes a relatively low power transmitter for transmitting said encoded data over a local area included in said general area.

5. A system according to claim 1 wherein said receiving means includes an antenna connected to the input of a radio frequency amplifier tuned for amplifying signals in a frequency band including said first and second frequency carrier signals.

6. A system according to claim 1 wherein said reference signal generating means includes means for generating a train of pulse signals, means for generating a bistable output signal and being responsive to said pulse signals for switching said bistable output signal between two stable states, a frequency select circuit for generating first and second select signals in response to respective states of said bistable output signal and a local oscillator responsive to said first and second select signals for generating said first and second reference signals respectively.

7. A system according to claim 6 wherein said receiving means includes means for generating a reset signal and wherein said means for generating a bistable output signal is responsive to said reset signal for generating said bistable output signal in a predetermined one of said stable states.

8. A system according to claim 7 wherein said means for generating a bistable output signal is a flip flop having a clock input connected to said pulse generating means and an output connected to said frequency select circuit and is responsive to individual ones of said pulse signals for switching said bistable output signal at said output between a 1 stable state and a 0 stable state, wherein said flip flop has a reset input connected to said reset signal generating means and is responsive to said reset signal for generating said 0 stable state, and wherein said frequency select circuit is responsive to said bistable output signal in said 1 and 0 stable states for generating said first and second select signals respectively.

9. A system according to claim 6 wherein said means for detecting said SCA components and for directing said reference signal generator means includes a SCA detector having an input connected to said difference signal generating means for detecting the presence of said SCA components in said difference signal and for generating an output signal in response to said detection and includes a gate circuit connected between said pulse signal generating means and said bistable output signal generating means for passing said pulse signals, said gate circuit being responsive to said SCA detector output signal to prevent the passage of said pulse signals.

10. A system according to claim 11 wherein said central broadcasting station transmits, as an SCA component of a FM carrier signal having a third frequency, said encoded data and wherein said remote broadcasting station includes means for receiving said third frequency FM carrier signal.

11. A system according to claim 2 wherein said central broadcasting station transmits said encoded data was a SCA component having a first SCA frequency and a SCA component having a second SCA frequency, said first and second SCA frequency components being components of said first frequency FM carrier signal and wherein said remote broadcasting station includes means for receiving said second frequency SCA component of said first frequency FM carrier signal.

* * * * *